July 26, 1949.    L. J. CHU    2,477,510
SLOTTED WAVE GUIDE ANTENNA
Filed Jan. 31, 1944    2 Sheets-Sheet 2

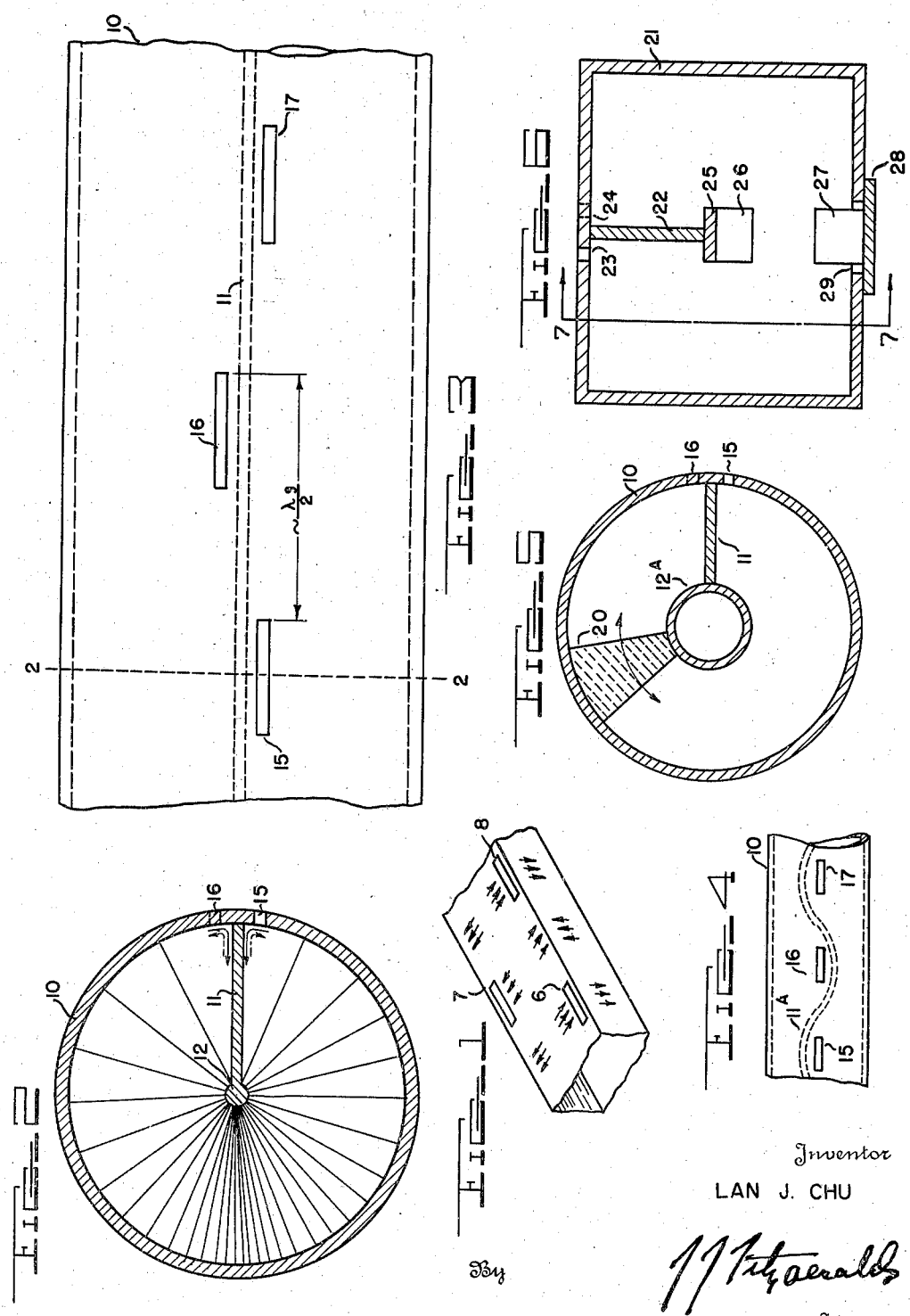

INVENTOR
LAN JEN CHU

By    ATTORNEY

Patented July 26, 1949

2,477,510

UNITED STATES PATENT OFFICE 2,477,510

SLOTTED WAVE GUIDE ANTENNA

Lan Jen Chu, Cambridge, Mass., assignor, by mesne assignments, to the United States of America as represented by the Secretary of the Navy Application January 31, 1944, Serial No. 520,472

12 Claims. (Cl. 250—33.63)

This invention relates to apparatus for the transmission of high-frequency electric oscillations and particularly to apparatus of the class known as wave guides. The invention concerns special forms of wave guides adapted for interchange of energy with the surrounding space through a plurality of slots or other suitable antenna elements located at spaced intervals along the wave guide.

Because of the well-known phenomenon that the wave length of oscillations in hollow pipe wave guides is generally longer than the wave length of oscillations of the same frequency in free space, it is desirable, in the construction of apparatus for the interchange of energy between a wave guide and free space having particular directive properties, to provide more than one slot or radiating element for each length of the wave guide equal to the wave length of the oscillations in free space. One way which I have devised for doing this with a conventional rectangular wave guide is shown in Fig. 1. In Fig. 1, the slots 6, 7, and 8 are alternately displaced towards one and the other of the edges of one of the broad walls of the wave guide, so that the current intercepted by these slots, and consequently the electric field across the slots, will be substantially in phase when corresponding portions of these slots are separated by one-half of the wave length in the wave guide. The lateral displacement of these slots, however, disturbs the pattern of the system when regarded as an antenna array, and the pattern is distinctly less desirable than that obtained with a substantially linear array.

An object of the present invention is to provide a form of wave guide adapted to interchange energy with surrounding space in a sharply directive manner through slots as closely spaced longitudinally as those shown in Fig. 1 but arranged so that there is at most relatively small departure from the linear distribution.

The invention is explained with reference to the accompanying drawing in which:

Fig. 2 is a cross section, and Fig. 3 is an elevation of a form of wave guide according to the present invention provided with slots for the interchange of energy between said wave guide and surrounding space;

Fig. 4 is an elevation of a modification of the apparatus of Figs. 2 and 3;

Fig. 5 is a cross section of a form of wave guide in accordance with the present invention including means for varying the wave length in the wave guide;

Fig. 6 is a cross section of another form of wave guide in accordance with the present invention, also including means for varying the wave length in the wave guide;

Figure 7:
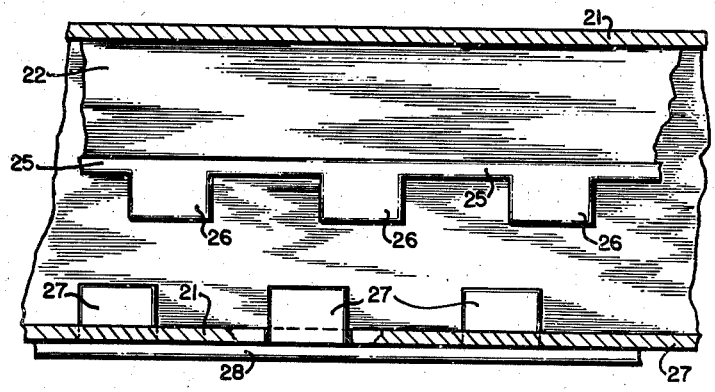
Fig. 7 is a sectional elevation of the wave guide of Fig. 6.

The cylindrical wave guide 10 shown in Figs. 2 and 3 is provided with a longitudinal partition or septum 11 of conducting material extending from the cylindrical wall to the center of the wave guide. If desired, the inner edge of the septum 11 may be beaded as shown at 12 in order to inhibit the occurrence of corona discharge and the like. The wave guide wall 10 and the septum 11 will normally be made of a metal, such as copper or brass. When the wave guide is excited in a suitable manner, as by impressing a voltage between the inner edge of the septum 11 and the portion of the cylindrical wall of the wave guide 10 opposite the septum, or by a transverse exciting loop preferably located near the attachment of the septum to the cylindrical wall, electric waves will travel down the wave guide with the transverse distribution of the intensity of the electric field substantially as shown by the radial lines in Fig. 2. Thus, it will be seen that the electric field is concentrated in the portion of the wave guide opposite the position of the septum 11, and it will also be observed that the oscillating electric currents flowing in a transverse direction are greatest, and the longitudinal magnetic field hence most concentrated, in the portion of the wave guide walls near the attachment of the septum 11 to the cylindrical wall 10. The flow of transverse current is indicated by the arrows on Fig. 2. There will also be longitudinal oscillating currents, which will again be concentrated on that part of the wave guide wall 10 which is opposite (i. e., circumferentially farthest from) the position of the septum.

If now a longitudinal slot is cut near the foot or root of the septum 11, as, for instance, the slot 15, transverse currents of relatively great magnitude will be intercepted and an alternating electric field will be produced across the slot, so that the slot is adapted for interchange of energy between the wave guide and surrounding space. If, at the same longitudinal position in the wave guide, a slot were cut just on the other side of the septum 11, it will be seen from the orientation of the arrows in Fig. 2 that an electric field would be produced oppositely directed to that across the slot 15. Thus the slots 15, 16, and 17 will be excited much as the slots 6, 7, and 8 of Fig. 1 are adapted to be excited with the great advantage that the slots 15, 16, and 17 lie almost in a straight line so that a desirable directive antenna pattern is obtainable. The deviation from the straight line arrangement is sufficiently small in the apparatus illustrated in Figs. 2 and 3 to be neglected in practice. Further improvement is possible, at the expense of slight complications, as shown in Fig. 4. In Fig. 4, the slots 15, 16, and 17 lie in a straight line parallel to the axis of the wave guide 10, but the septum, shown at 11A weaves slightly back and forth between the slots.

It will be understood that although the spacing between corresponding portions of successive slots such as the slots 15 and 16 will be of the general order of magnitude of one-half of the wave length in the wave guide 10, the exact spacing is to be determined in accordance with the desired orientation of the maximum directivity of the system with respect to the axis of the wave guide 10, in accordance with the principles outlined in the patent application of L. W. Alvarez, Serial No. 509,790, filed November 10, 1943. With spacing equal to one-half of the wave length in the wave guide, the maximum directivity will lie in a plane perpendicular to the axis of the wave guide 10. By varying the spacing between corresponding portions of successive slots, (or, likewise, by varying the wave length in the wave guide) the direction of maximum effect may be swung away from the perpendicular position down to angles as small as 30 degrees with the axis of the wave guide. It is not practical to go to smaller angles with apparatus of the type of Figs. 2 and 3, because simple slots are not adapted to radiate well at very small angles to the axis of the wave guide. For small angle radiation, it is preferable to employ, instead of slots, wires extending through a hole in the wave guide and coupled with the oscillating field of the wave guide, as by suitable small loops.

Fig. 5 shows a form of wave guide essentially similar to that shown in Figs. 2 and 3 but additionally provided with means for varying the wave length in the wave guide. The outer cylindrical wall of the wave guide is again shown at 10 and the septum at 11. The end of the septum 11, instead of being only slightly beaded, is provided with a tubular conductor 12A longitudinally connected to the septum 11. A series of slots is again provided, as in Fig. 3, these being shown generally at 15 and 16 in Fig. 5. In order to vary the wave length in the wave guide, a strip of solid dielectric material, such as polystyrene, shown in cross section at 20, is moved about in the wave guide. Such motion is preferably revolution about the axis of the wave guide and is indicated by the double-headed arrow. When the polystyrene strip 20 is in a position diametrically opposite (i. e., circumferentially farthest from) that of the septum 11 (and hence, approximately coplanar with the septum), it will lie in the most intense portion of the electric field of the wave guide and will have a relatively large wave-length-shortening effect, whereas when it is in other positions in the wave guide, it will be in a less intense oscillating electric field, and it will have less wave-length-shortening effect.

Another method of varying the wave length in a wave guide constructed in accordance with the present invention is to introduce, in a radial direction, masses of solid dielectric material, such as polystyrene, through suitable slots in the portion of the outer cylindrical wall 10 of the wave guide farthest from the septum 11, the wave length being shorter as more dielectric material is thus introduced. This last method may have an advantage over that shown in Fig. 5 in causing less unbalance of the magnetic field, although the arrangement of Fig. 5 will not cause an undesired amount of unbalance of the magnetic field for a reasonable amount of displacement of the dielectric strip 20. The arrangement of Fig. 5 has the advantage that if the strip 20 is oscillated back and forth through the position of maximum electric field intensity, each complete cycle of the movement of the strip 20 will produce two cycles of wave length variation.

The invention is not limited to wave guides of circular cross section, since a septum such as that shown at 11 which produce an analogous effect on the electric field distribution, and the distribution of the circulating transverse current in wave guides of other cross sections, such as elliptical wave guides or rectangular wave guides. A rectangular wave guide constructed in accordance with the present invention and provided additionally with means for varying the wave length in the wave guide in accordance with the principles described in the patent application of M. G. White, Serial No. 504,777, filed October 6, 1943, is shown in Figs. 6 and 7. The wave guide is shown in cross section, the outer walls being shown at 21. The septum 22 is mounted on the middle of one of the walls of the wave guide. A series of slots on alternate sides of the septum 22 is indicated generally at 23 and 24. In order to provide for variation of the wave length in the wave guide, a strip 25 of conducting material is mounted on the end of the septum 22, and is provided with a succession of relatively closely axially-spaced transverse fins 26, also of conducting material, extending towards the lower wall of the wave guide. The spacing between the fins 26 is preferably a little larger than the thickness of these fins. A similar series of transverse fins, shown at 27, is mounted upon a longitudinal metal strip 28 and protrudes through a longitudinal slot 29 in the bottom wall of the wave guide. The strip 28 and the fins 27 mounted thereon are adapted to be moved longitudinally with respect to the wave guide. Both the fins 27 and the fins 26 act to shorten the wave length in the wave guide, but the combined effect of these members is greatest when the longitudinal positions of the fins 26 register with the longitudinal positions of the fins 27. As the strip 28 is moved longitudinally to move the fins 27 out of registry with the fins 26, the wave length is progressively lengthened (the wave length shortening effect is decreased). In order to avoid the necessity of extremely fine control of the longitudinal movement of the strip 28, the fins 26 and 27 may be made relatively thick, so that they might more aptly be described as metallic blocks, but the longitudinal dimension of the fins 26 and 27 and of the spaces between successive members of the series should, however, be kept sufficiently small that the limiting wave length of twice the spacing between corresponding positions of successive fins of each series is not reached nor closely approached.

Figure 8:
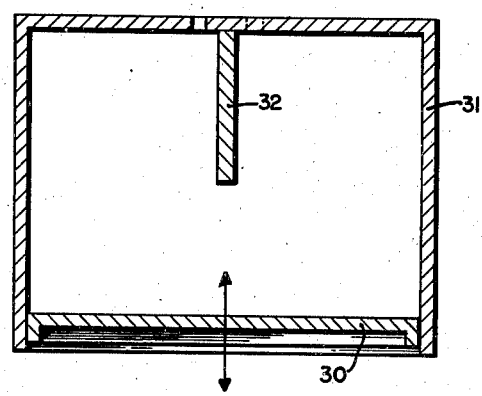
Fig. 8 is a cross section of still another form of wave guide in accordance with the present invention.

Another method of varying the wave length in a wave guide structure having a rectangular form is illustrated in Fig. 8. In Fig. 8 the bottom wall 30 of wave guide 31 is made movable relative to septum 32 and the opposite wall of the wave guide. Movement of wall 30 results in adjustment of the vertical dimension of the wave guide. Adjusting the vertical dimension of such a wave guide corresponds generally to adjusting the broad dimension of a wave guide of the type shown in Fig. 1, and consequently, controls the wave length in the wave guide. With such an arrangement, the fins 26 and 27 and their associated supporting structure may be omitted.

The provision of the longitudinal septum or partition partially dividing the interior of the wave guide structure may be said to have the function of bringing close together the two portions of the wave guide wall respectively carrying oppositely directed transverse current, so that it is then possible to provide a longitudinal series of slots deviating very little from the straight line arrangement which is adapted for the interchange of energy between the wave guide and surrounding space with sharp and unambiguous directive characteristics.

What I desire to claim and obtain by Letters Patent is:

1. A wave guide adapted for interchange of energy between itself and surrounding space with substantially unambiguous and relatively sharp directional characteristics, said wave guide comprising a tubular metallic wall and a longitudinal metallic partition attached at one of its edges to said tubular wall and having its other edge located near the central axis of the wave guide, said tubular wall further having a longitudinal series of equally spaced means for interchanging energy between said wave guide and surrounding space, successive members of which series are located on alternate sides of said partition near its attachment to said tubular wall.

2. A wave guide adapted for interchange of energy between itself and surrounding space with the production of a relatively sharp directional characteristic, said wave guide comprising a tubular metallic wall and a longitudinal metallic partition attached at one of its edges to said tubular wall anad having its other edge located near the central axis of the wave guide, said tubular wall further having distributed along its length a series of equally spaced longitudinally oriented slots, successive members of which series are located on alternate sides of said partition near its attachment to said tubular wall.

3. A wave guide adapted for interchange of energy between itself and surrounding space with the production of substantially unambiguous and relatively sharp directional characteristics, said wave guide comprising a cylindrical metallic wall and a longitudinal metallic partition attached at one of its edges to said cylindrical wall and having its other edge located near the axis of said cylindrical metallic wall, said cylindrical wall further having a longitudinal series of longitudinally oriented slots, successive members of which series are located on alternate sides of said partition near its attachment to said cylindrical wall.

4. A wave guide adapted for interchange of energy between itself and surrounding space with the production of substantially unambiguous and relatively sharp directional characteristics, said wave guide comprising an outer cylindrical metallic wall and a longitudinal metallic partition attached at one of its edges to said cylindrical wall, oriented substantially in a radial plane with respect to said cylindrical wall and terminating at its inner edge in an inner cylindrical surface approximately coaxial with said outer cylindrical wall, said inner cylindrical surface being electrically conducting and electrically and mechanically connected along its length to said partition, said outer cylindrical wall further having a longitudinal series of equally spaced longitudinally oriented slots, successive members of which series are located on alternate sides of said partition near its attachment to said outer cylindrical wall.

5. A wave guide adapted for interchange of energy between itself and surrounding space with the production of substantially unambiguous and relatively sharp directional characteristics, said wave guide comprising a cylindrical metallic wall and a longitudinal metallic partition attached at one of its edges to said cylindrical wall and extending radially toward the axis of said cylindrical wall, said cylindrical wall further having a series of equally spaced longitudinally oriented slots arranged in a straight line parallel to the axis of said cylindrical wall, said partition being so shaped and so attached to said cylindrical wall that the juncture of said partition and said cylindrical wall forms a sinuous line passing between successive slots of said series and passing relatively close to each of said slots.

6. A tubular wave guide adapted to produce intense transverse currents in opposite directions in close proximity, which comprises a tubular metallic wall, a longitudinal metallic wall attached at one of its edges to said tubular wall and having its other edge located near the central axis of the wave guide and a sheet of solid dielectric material extending from said other edge of said metallic wall to a position on said tubular wall opposite the point of attachment of said metallic wall to said tubular wall.

7. A tubular wave guide adapted to produce intense transverse currents in opposite directions in close proximity, which comprises a tubular metallic wall, a longitudinal metallic wall attached at one of its edges to said tubular wall and having its other edge located near the central axis of the wave guide and a sheet of solid dielectric material extending radially outward from said other edge of said metallic wall, said sheet of dielectric material being rotatable about said central axis of the wave guide.

8. A wave guide adapted for interchange of energy between itself and surrounding space with substantially unambiguous and relatively sharp characteristics, said wave guide comprising a tubular metallic wall, a longitudinal metallic partition attached at one of its edges to said tubular wall and having its other edge located near the central axis of the wave guide and a sheet of solid dielectric material extending from said other edge of said partition radially to a position adjacent to said tubular wall, said tubular wall further having a longitudinal series of equally spaced means for interchanging energy between said wave guide and surrounding space, successive members of which series are located on alternate sides of said partition near its attachment to said tubular wall.

9. A wave guide as claimed in claim 8 wherein said sheet of dielectric material is rotatable about said central axis.

10. In the wave guide of claim 2, means for altering the wavelength of the energy propagated within said wave guide, said means comprising a sheet of solid dielectric material having one edge thereof adjacent to said other edge of said partition and extending radially outward toward said tubular wall, said sheet of dielectric material being rotatable about said central axis.

11. A wave guide adapted for interchange of energy between itself and surrounding space, said wave guide comprising a tubular metallic wall, a longitudinal metallic partition attached at one of its edges to said tubular wall and having its other edge located near the central axis of the wave guide, said tubular wall further having distributed along its length a series of longitudinally oriented slots, successive members of which series are located on alternate sides of said partition near its attachment to said tubular wall.

12. A wave guide adapted for interchange of energy between itself and surrounding space, said wave guide comprising a tubular metallic wall, a longitudinal metallic partition attached at one of its edges to said tubular wall and having its other edge located near the central axis of the wave guide, said tubular wall further having a longitudinal series of means for interchanging energy between said wave guide and surrounding space, successive members of which series are located on alternate sides of said partition near its attachment to said tubular wall, and means operative independently of signal frequency for altering the wave length of the energy transmitted by said wave guide.

LAN JEN CHU.

REFERENCES CITED

The following references are of record in the file of this patent:

UNITED STATES PATENTS

| Number | Name | Date |
| --- | --- | --- |
| 2,199,083 | Schelkunoff | Apr. 30, 1940 |
| 2,241,119 | Dallenbach | May 6, 1941 |
| 2,317,503 | Usselman | Apr. 27, 1943 |
| 2,433,368 | Johnson et al. | Dec. 30, 1947 |